United States Patent [19]

Mizuno et al.

[11] Patent Number: 4,793,131

[45] Date of Patent: Dec. 27, 1988

[54] TIRE CORD MADE OF POLYVINYL ALCOHOL

[75] Inventors: Masaharu Mizuno, Ehime; Mituo Katoh, Okazaki, both of Japan

[73] Assignee: Toray Industries Inc., Tokyo, Japan

[21] Appl. No.: 26,794

[22] PCT Filed: Jun. 10, 1986

[86] PCT No.: PCT/JP86/00286

§ 371 Date: Feb. 11, 1987

§ 102(e) Date: Feb. 11, 1987

[87] PCT Pub. No.: WO86/07393

PCT Pub. Date: Dec. 18, 1986

[30] Foreign Application Priority Data

Jun. 12, 1985 [JP] Japan .............................. 60-125974
Jun. 12, 1985 [JP] Japan .............................. 60-125975

[51] Int. Cl.$^4$ .......................... D02G 3/02; D02G 3/48
[52] U.S. Cl. .................................. 57/243; 57/902; 152/451
[58] Field of Search ................ 57/243, 902; 152/451, 152/526, 527; 264/168, 184, 210; 428/364

[56] References Cited

U.S. PATENT DOCUMENTS

| 3,597,303 | 8/1971 | Tanaka .......................... 57/902 X |
| 3,826,298 | 7/1974 | Tanaka et al. .................. 57/902 X |
| 4,603,083 | 7/1986 | Tanaka et al. . |
| 4,698,194 | 10/1987 | Tanaka et al. . |

Primary Examiner—Donald Watkins
Attorney, Agent, or Firm—Armstrong, Nikaido, Marmelstein & Kubovcik

[57] ABSTRACT

Tire cord having enough high tensile strength, high initial modulus, and high fatigue resistance required for radial tire and belted bias tire can be obtained from polyvinyl alcohol polymer. Said cord is constituted by multifilament yarns composed of a polyvinyl alcohol polymer having a degree of polymerization of at least 2000, having a tensile strength of 15 g/d or more and an initial modulus of 250 g/d or more, and undergoing substantially no fusion between single filaments. It has cord properties of not less than 8.5 g/d in tensile strength, 0.5 to 2.2% in middle degree of elongation (MDE), and 0.2 to 2.0% in dry heat shrinkage factor ($\Delta$S).

8 Claims, No Drawings

TIRE CORD MADE OF POLYVINYL ALCOHOL

1. [Technical Field]

The present invention relates to a tire cord made of polyvinyl alcohol which is excellent in tensile strength, initial modulus and fatigue resistance and can give a pneumatic tire exhibiting excellent controllability, durability and quality reproducibility and low fuel consumption in high-speed running.

2. [Background Art]

There are three kinds of pneumatic tires depending upon the arrangement of cord or the direction thereof, i.e., bias, radial and belted bias tires, among which radial and belted bias tires are thought to be excellent in controllability in high-speed running owing to the retainer effect on the belt part.

As motorization has proceeded, the reinforcing material for the belt part of the above radial and belted bias tires has been required not only to have high strength, modulus, dimensional stability, impact resistance, adhesion, compressive modulus and stiffness and low growth, but also to be of low specific gravity and low cost.

Recently, as the construction of superhighway has proceeded, belted bias or radial tires which are excellent in controllability in high-speed running have spread. Among them, a radial tire having a belt made of steel fiber is particularly noted. However, such a radial tire is designed with too much regard to controllability. Therefore, the unevenness of a road tends to directly affect the car body to result in uncomfortable ride and residence. Further, the radial tire produces hideous noise in running. That is to say, the grounding part of a tire having a belt made of steel fiber is so rigid that the unevenness of a road directly affects the car body. Therefore, when the car runs on an uneven road, the car vibrates vigorously to result in uncomfortable ride and residence. Further, a steel fiber cord has essential disadvantages in that it tends to rust unlike an organic fiber cord, thus resulting in unsufficient durability and that the fiber has a high specific gravity to therefore give a heavy tire, thus increasing fuel consumption.

Under the above circumstances, a tire cord having a belt made of a combination of steel fiber and aramid fiber (for example, a product of Du Pont; "Kevlar") has been proposed as a tire cord which absorbs vibration due to the unevenness of a road as completely as possible to thereby improve comfortableness in riding. However, this tire cord has not widely been used as yet, and finds only limited uses, because the cost of the aramid fiber is high and the design and production of a tire containing such a tire cord are difficult.

A polyvinyl alcohol yarn has long been used as a tire cord. However, the polyvinyl alcohol fiber was too poor in fatigue resistance substantially to be used as a reinforcing material for the carcass of a radial tire. To improve the fatigue resistance of a polyvinyl alcohol yarn, a process for producing a polyvinyl alcohol yarn cord wherein the conditions of upper and lower twisting of the polyvinyl alcohol cord are specified has been proposed in Japanese patent publication No. 46-33601. However, the essential defect in fatigue resistance of a polyvinyl alcohol yarn could not be remarkably improved by this process aiming at improving the belt part from the viewpoint of the design thereof. Further, a cord obtained by intertwining three polyvinyl alcohol raw yarns of 1200 denier (d) according to the prior art exhibited a breaking strength of at most about 30 kg an a tensile strength of at most about 7.5 g/d. Thus, it was remarkably inferior in mechanical strength to the above aramid yarn cord.

Under these circumstances, Japanese patent application Kokai publication No. 59-130314 discloses a spinning process which comprises introducing a solution of a high-molecular weight polyvinyl alcohol having a molecular weight of at least 500,000 maintained at a high temperature via a spinneret into a cooling bath to form a rubbery fibrous gel from the introduced solution and removing the solvent from the rubbery fibrous gel by extraction to obtain a polyvinyl alcohol yarn having a tensile strength of at least 10 g/d and an initial modulus of at least 200 g/d (i.e., gel spinning process).

However, this process necessitates a polyvinyl alcohol having a molecular weight of at least 500,000 which is difficult to prepare industrially (in the above Japanese patent application Kokai publication, such a polymer is actually prepared by an unordinary polymerization process involving irradiation with ultraviolet at a low temperature for a long time). Further, though the Laid-Open Patent discloses the production of monofilament, it does not disclose the production of multifilament yarn which is useful as a tire cord. Accordingly, though a monofilament can be easily produced by the above gel spinning process, a multifilament yarn is difficultly produced by it, because the production of a multifilament yarn additionally requires avoidance of fusion between single filaments. Thus, a high-strength polyvinyl alcohol yarn produced by the process could not be used as raw yarn for tire cord.

The inventors of the present invention have given attention to a polyvinyl alcohol yarn which is not heavy, does not rust, unlike a steel fiber, and is not costly, unlike an aramid yarn, and have remarkably improved the characteristics thereof required of tire cord (for example, mechanical properties and fatigue resistance) as compared with the polyvinyl alcohol yarn according to the prior art. Further, they have studied on the application of the improved polyvinyl alcohol yarn to a tire cord and have accomplished the present invention as a result of the study.

[DISCLOSURE OF INVENTION]

An object of the present invention is to provide a tire cord constituted by polyvinyl alcohol multifilament yarns which has enough characteristics to be used as a belt of a radial tire excellent in controllability in high speed running, such as high strength, high modulus, excellent fatigue resistance, dimensional stability, thermal resistance, low heat generation, low growth and adhesion. Another object of the present invention is to provide a tire cord made of polyvinyl alcohol which can be used not only as a belt but also as a carcass of a radial tire or belted bias tire satisfying the above characteristics as much as possible. Still another object of the present invention is to provide a pneumatic tire which has an improved uniformity and is excellent in comfort in riding and controllability.

The present invention relates to a tire cord constituted by multifilament yarns composed of a polyvinyl alcohol polymer having a degree of polymerization of at least 2000, having a tensile strength of 15 g/d or more and an initial modulus of 250 g/d or more and undergoing substantially no fusion between single filaments, which has cord properties of not less than 8.5 g/d in tensile strength, 0.5 to 2.2% in medium elongation (MDE) and 0.2 to 2.0% in thermal shrinkage ($\Delta S$).

That is to say, the inventors of the present invention have given attention to the fact that the characteristics of a polyvinyl alcohol tire cord, such as the above-mentioned mechanical strength and fatigue resistance, can be enhanced by enhancing the degree of polymerization of the polyvinyl alcohol composing the multifilament yarns of the tire cord and have conducted an intensive study. As a result of this study, they have found that multifilament yarns which do not undergo fusion between single filaments and can form a tire cord excellent in mechanical properties and fatigue resistance can be obtained from a polyvinyl alcohol polymer having a high degree of polymerization by employing specified spinning means and specified yarn-making means, although an increase in the degree of polymerization of polyvinyl alcohol generally brings about a remarkable lowering in spinnability and yarn-making properties thereof, particularly in drawability, and fusion between single filaments.

[BEST MODE FOR CARRYING OUT THE INVENTION]

The polyvinyl alcohol multifilament yarn constituting the tire cord of the present invention is composed of a polyvinyl alcohol polymer having a degree of polymerization of at least 2000, preferably 3000 to 5000, has a high tensile strength of 15 g/d or more and a high initial modulus of 250 g/d or more and does not undergo fusion between single filaments. The physical properties of the tire cord according to the present invention is directly affected by the above excellent properties of the yarn made of polyvinyl alcohol having a high degree of polymerization Particularly, the degree of polymerization of the polyvinyl alcohol polymer composing the multifilament yarn has a great influence not only upon the mechanical properties (such as tensile strength or initial modulus) of the multifilament yarn but also upon the characteristics of the tire cord, for example, fatigue resistance, thermal resistance and water resistance, so that the higher the degree, the better the result. However, as the degree of polymerization increases, the fiber-forming properties lower and it becomes more difficult to enhance the properties of the obtained multifilament yarn. Further, a polyvinyl alcohol polymer having too high a degree of polymerization is difficultly available commercially and therefore must be prepared by unordinary means, thus unfavorably resulting in enhanced cost. For these reasons, it is preferred that the upper limit of the degree of polymerization of the polyvinyl alcohol polymer is about 5700, particularly preferably about 5000.

The multifilament yarn composed of the above polyvinyl alcohol having a degree of polymerization of at least 2000 must have a tensile strength of 15 g/d or more, preferably 17 g/d or more, and an initial modulus of 250 g/d or more, preferably 290 g/d or more, still preferably 350 g/d or more. According to the present invention, a reinforcing effect of tire cord is enhanced by both the high tensile strength and the high modulus of the yarn, so that the amount of yarn or the number of plies applied to a tire can be reduced, the degree of deformation of a tire can be reduced and the deformation recovery properties can be enhanced. Thus, the weight of a tire itself can be reduced to result in lowered fuel consumption. Further, the usefulness of the yarn as a reinforcing material for radial or belted bias tires requiring high-speed stability, durability, wear resistance and the like can be remarkably enhanced.

Now, a process of the production of the polyvinyl alcohol multifilament yarn constituting the tire cord according to the present invention will be described.

A polyvinyl alcohol polymer having a degree of polymerization of at least 2000 is dissolved in a suitable solvent to obtain a solution having a concentration of 5 to 25% by weight. Examples of the solvent include organic solvents such as dimethyl sulfoxide (DMSO), glycerin, ethylenediamine, ethylene glycol, diethylenetriamine and phenol; water; aqueous solutions of inorganic salts such as zinc chloride, sodium thiocyanate, calcium chloride and aluminum chloride and mixtures thereof.

The obtained solution is used as a spinning solution and extruded via a multi-hole spinneret having generally at least 20 holes, preferably 50 to 5000 holes. According to the present invention, the high-strength and high-modulus multifilament yarn composed of polyvinyl alcohol must be produced in such a way as to prevent fusion between single filaments effectively. And the obtained stretched yarn must not give long-period images in the small-angle X-ray scattering analysis thereof. Therefore, special contrivance which will be described must be made in the spinning and treatment of the multifilament yarn.

An example of such a spinning process is an industrially advantageous dry-jet wet spinning process which comprises jetting a spinning solution into an inert atmosphere such as air and introducing the jetted fibrous substance into a coagulating bath.

Examples of the coagulating agent to be used in the dry-jet wet spinning process for the purpose of completing the coagulation of the fibrous substance jetted from a spinneret include alcohols such as methanol ethanol and butanol; acetone; benzene; toluene; mixtures of DMSO with at least one of them; saturated aqueous solutions of inorganic salts and aqueous caustic soda, among which alcohols such as methanol and ethanol and acetone are preferred.

Although the distance between the spinneret and the surface of the coagulating bath is not particularly limited, if the distance is less than 3 mm, the advantageous characteristics of the dry-jet wet spinning process will not be exhibited sufficiently. Therefore, no fine multifilament yarn will be formed or the spinning stability will be lowered. On the contrary if the distance is more than 50 mm, the fibrous substance jetted from a spinneret will be difficult to run stably, so that they will be brought into contact with each other by slight shaking to result in fusion. Accordingly, the distance is preferably selected from 3 to 50 mm.

The obtained coagulated multifilament yarn is then stretched by a single- or multi-stage process generally 2-to 5-fold. Then, it is dried, preferably while the single filaments are separated from each other and vibrated by exposing them to a turbulent flow of a gas. Further, the fusion between single filaments can be effectively prevented by applying an oil to the multi-filament yarn prior to the drying with a turbulent flow of a gas. Furthermore, the fusion between single filaments remaining after the drying may be removed by, for example, exposing the yarn to a turbulent flow of a gas.

The dried multifilament yarn thus obtained is subjected to hot drawing by the use of heating means such as heated tube, heated roll, hot plate, hot pin, heated liquid or fluidized bed. Although the drawing temperature may be any one which is lower than the melting point (about 250° C.) of the polyvinyl alcohol, it is preferably as near the melting point as possible, i.e., between 160° and 250° C.

The final total stretch ratio by the above hot drawing is at least 10, preferably at least 12. That is to say, the drawing may be made until the small-angle X-ray scattering analysis of the obtained multifilament yarn gives no long-period image.

The tire cord constituted by the multifilament yarns thus obtained according to the present invention must have cord properties of not less than 8.5 g/d in tensile strength, 0.5 to 2.2% in medium elongation (MDE) and 0.2 to 2.0% in thermal shrinkage ($\Delta S$). If the tensile strength is less than 8.5 g/d, the tire-reinforcing effect will be unfavorably lowered. Particularly, when the tire cord is used as a reinforcing material for a belt part, it is preferred that the cord ha a tensile strength of at least 11 g/d, because of the relationship with the coefficient of twist of green cord (raw cord) which will be described hereinbelow.

The medium elongation (MDE) is 0.5 to 1.2%, preferably 0.8 to 1.2%, when the cord is used as a reinforcing material for a belt part, while it is 1.0 to 1.9%, preferably 1.2 to 1.7%, when the cord is used as a reinforcing material for a carcass part. If the medium elongation is lower than 0.5%, the tire cord will be poor in toughness and will exhibit remarkably lowered fatigue resistance. On the contrary, if it is higher than 2.2%, the deformation of a tire under a load will not be effectively depressed, which is unfavorable.

The thermal shrinkage ($\Delta S$) is 0.2 to 1.4%, preferably 0.5 to 1.2%, when the cord is used as a reinforcing material for a belt part, while it is 0.4 to 2.0%, preferably 0.8 to 1.7%, when it is used as a reinforcing material for carcass part. If the thermal shrinkage ($\Delta S$) is less than 0.2%, it will be difficult to absorb slight sag caused by burying the cord in molding a tire. On the contrary, if it is higher than 2.0%, the modulus of the cord will be lowered in molding a tire owing to its high heat shrinkage, so that the tire cord will cause significant deformation (under load) in the molded tire to thereby lower the running stability of the radial tire and the molding stability of the tire, thus resulting in a enhanced reject rate.

The tire cord having the above cord properties according to the present invention has a coefficient of twist which is selected from 500 to 2500, preferably 900 to 2100, depending upon the object and use. There is a certain relationship between the coefficient of twist of the cord and the mechanical properties or fatigue resistance thereof. That is to say, as the coefficient of twist increases, the fatigue resistance is enhanced with a lowering in mechanical properties (for example, strength or modulus). Further, the properties required of a tire cord vary depending upon tee part of a tire to which the cord is applied. For example, when the cord is used in a belt part, enhancement in mechanical properties, particularly modulus, is required more strongly than that in fatigue resistance, while when it is used in a carcass part, enhancement in fatigue resistance is required more strongly than that in mechanical properties.

For the above reasons, the coefficient of twist of the tire cord to be used as a reinforcing material for a carcass part may be from 1500 to 2500, preferably from 1600 to 2100, while that of the tire cord to be used as a reinforcing material for a belt part may be from 500 to 1500, preferably 900 to 1400. Further, the coefficient of twist of tee tire cord to be used as a reinforcing material for a belt is preferably from 500 to 1500. When the tire cord is used as reinforcing material for a belt, the fatigue resistance will be remarkably lowered if the coefficient of twist is less than 500, while the medium elongation (MED) will be high to lower the modulus if it is more than 1500, which is unfavorable because high modulus is required of a belt. On the other hand, when the tire cord is used as a reinforcing material for a carcass part, the fatigue resistance of the cord will be not enough to be used in carcass part if the coefficient of twist is less than 1500, while the medium elongation (MED) will be high to lower the modulus unfavorably if it is more than 2500.

The tire cord according to the present invention can exhibit excellent cord properties, even if it has any coefficient of twist selected from the above range for a carcass component or a belt component.

The fineness of the single filament constituting the polyvinyl alcohol multifilament yarn may be 055 to 5 denier (d) preferably 1 to 3 d. If the fineness is less than 0.5 d, the multifilament yarn will tend to be damaged in the post-processing such as twisting to bring about fuzzing or lowered strength. On the contrary, if the fineness is more than 5 d, the multifilament yarn will be rigid to exhibit a lowered flexibility, so that its post-processing properties such as twistability will be lowered, thus lowering the strength or the fatigue resistance of the cord.

The high-strength and high-modulus multifilament yarn composed of the above polyvinyl alcohol having a high degree of polymerization which constitutes the tire cord according to the present invention has structural characteristics wherein no long-period image is observed in the small-angle X-ray scattering analysis thereof. The characteristics wherein no long-period image is observed in the meridian direction means that the yarn has a structure wherein the polymer chain constituting the multifilament yarn is highly oriented in the direction of the fiber axis and the difference in density between the crystalline part and the amorphous part is small. Actually, owing to such structural characteristics, both the thermal shrinkage of the multifilament yarn and the thermal deformation caused by vulcanizing the rubber in which the twisted tire cord has been buried are remarkably small. Accordingly, the tire cord constituted by the above multifilament yarns exhibits high modulus and is excellent in fatigue resistance owing to the perfectness and stability of the fiber structure. Therefore, the tire cord serves to prevent the deformation of the side wall of a tire and to enhance the fatigue resistance of a carcass. Thus, the tire cord according to the present invention satisfies the characteristics require of a tire cord.

Now, a process for the production of a tire cord satisfying the above cord properties from high-strength and high-modulus multifilament yarns composed of a polyvinyl alcohol polymer having a high degree of polymerization will be described in detail.

The above polyvinyl alcohol multifilament yarns are twisted with an ordinary twister so as to give a coefficient of twist of within the above range suitable to be used as a tire cord. The obtained twisted yarns are dipped in an ordinary adhesive such as resorcinol-formalin-latex (hereinafter referred to merely as "RFL") or epoxy resin to thereby impart adhesion to rubber thereto.

Representative examples of the adhesive are as follows:

| RF | resorcinol (100%) | 18.5 g |
|---|---|---|
| | formalin (37%) | 27.0 g |
| | NaOH (10%) | 6.1 g |
| | water | 240.3 g |
| RFL | VP Latex (a product of Nippon Zeon Co., Ltd.; "Nipol" 2518FS) | 427.3 g |
| | water | 280.9 g |
| | TSC | 20% |
| | RF/L ratio | 1/6 |
| | RF aging | 25° C. × 6 hrs |
| | RFL aging | 25° C. × 12 hrs |

It is preferable that the TSC of the adhesive is so high (at least 20%) as to reduce the amount of RFL soaking into the green cord as much as possible, thereby enhancing the adhesion of the cord to the rubber and the strength of the cord. Similarly, it is preferable that the concentration of RFL is also so high as to reduce the amount of RFL adhering to the cord as much as possible. For example, the amount of RFL adhering to the cord is generally at most 10%, preferably to most 8%.

The adhesive-treated cord (dipped cord) is subjected to drying and heat treatment. That is to say, the cord is passed through a drying zone having a temperature of 100° to 160° C., preferably 110° to 150° C. for 60 to 240 seconds, preferably 90 to 180 seconds under a stretch of 0 to 3%, preferably 0 to 2%, a heating zone having a temperature of 160° to 240° C., preferably 170 to 220° for 20 to 60 seconds, preferably 30 to 50 seconds under a stretch of 0 to 4%, preferably 1 to 3% (when the cord is 1500D/2, under a tension of 1 to 6 kg, preferably 1.5 to 4 kg) and finally a normalizing zone having a temperature of 160° to 240° C., preferably 170° to 220° C. for 20 to 60 seconds, preferably 30 to 50 seconds, under a stretch of −3 to 1%, preferably −2 to 0% (when the cord is 1500D/2, under a tension of 1 to 5 kg, preferably 1 to 3 kg per cord) successively.

The cord thus obtained (i.e., dipped cord) has been found to have a property wherein the smaller the flexural rigidity, the higher the strength.

Therefore, it is preferable that the treated cord obtained by the above procedure is subjected to softening treatment to reduce the flexural rigidity of the cord, thereby improving the easiness in passing various steps and handleability of the cord as well as enhancing the strength thereof.

[EXAMPLE]

The effect of the present invention will be described by the following Examples in more detail.

The characteristics of raw yarn, cord properties, GY tube fatigue resistance, method of small-angle X-ray scattering analysis and separability of single filament were measured by the following methods, respectively.

Characteristics of raw yarn

Tensile strength, elongation and initial modulus were measured according to JIS-L-1017. A hank of a sample was allowed to stand in a room conditioned to 20° C. and 65%RH for 24 hours and twisted 8 turns per 10 cm. The resulting sample was examined by the use of a tensile strength tester of DTM-4L type "Tensilon" (a product of Toyo Baldwin Co., Ltd.) under conditions of sample length of 25 cm and stretching rate of 30 cm/minute. An air jaw for cord was used as a check.

Cord properties (i) Coefficient of twist was calculated by the following equation:

$$\text{Coefficient of twist} = \text{number of twists (turns/10 cm)} \times \sqrt{\text{(fineness of raw yarn)} \times \text{(number of intertwined yarns)}}$$

(ii) Tensile strength was measured under the same conditions as those used in the above case of raw yarn.

(iii) Thermal shrinkage ($\Delta S$)

A hank of a sample was allowed to stand in a room conditioned to 20° C. and 65%RH for 24 hours. A load corresponding to 0.1 g/d was applied to a sample to measure the length of the sample (l). The sample was allowed to stand in an oven of 180° C. under dry atmosphere in a weightless state for 30 minutes and taken out of the oven. The sample was allowed to stand in a room conditioned as above for 4 hours. A load corresponding to 0.1 g/d was again applied to the sample to determine its length ($l_1$) The thermal shrinkage ($\Delta S$) was calculated according to the following equation:

$$\Delta S = [(l - l_1)/l] \times 100 \ (\%)$$

(iv) Medium elongation (MDE)

A degree of elongation under a specified load was determined based on the load-elongation curve obtained by the above measurement of tensile strength. This degree of elongation was employed as a medium elongation. That is to say, when two yarns having a fineness of 1500 denier (D) were intertwined, the degree of elongation under a load of 6.75 kg was employed as its medium elongation. When the fineness of raw yarn or the number of intertwined yarns was different from the above one respectively, correction was made as follows:

When two yarns of 1000D were intertwined:
  degree of elongation under a load of 4.5 kg
When three yarns of 1000D were intertwined:
  degree of elongation under a load of 6.75 kg
When two yarns of 1800D were intertwined:
  degree of elongation under a load of 8.1 kg GY tube fatigue resistance Determined according to JIS-L-1017, 1321 (method A) with a bending angle of tube of 90°.

Small-angle X-ray scattering analysis

Examined according to the known method using a Kiessig Camera with the following device and following conditions.

Use of an X-ray generator of RU-200 type; a product of Rigaku Denki Co., Ltd.

$CuK_\alpha$ ray (use of a Ni filter), output: 50 kV-150 mA, use of a 0.3 mm$\phi$ collimator, soak method, radius of camera : 400 mm, exposure time : 90 minutes, film: a product of Kodak of no screen type.

Separability of single filaments

A multifilament yarn was cut into a length of 50 mm. The cut yarn was separated into single filaments. The ratio of the single filaments separated without sustaining damage such as breakage or fibrillation was determined and evaluated according to the following criteria:

○: 90% or more △: 70 to 89% x: 70% or less

EXAMPLE 1

A 12% by weight solution of a completely saponified polyvinyl alcohol (degree of saponification: 99.5% or more) having a degree of polymerization of 3500 in dimethyl sulfoxide (DMSO) was jetted via a spinneret having 750 holes having a diameter of 0.08 mm set at a distance of 5 mm upward from the surface of an alcoholic coagulating bath containing 15% by weight of DMSO into the coagulating bath. The obtained coagulated multifilament yarn was washed in a methanol bath to remove the DMSO. Then, the yarn was stretched 4-fold in a methanol bath and dried while separating the single filaments from each other with a turbulent flow of a gas. The multifilament yarn was stretched 5.1-fold with a dry heat tube heated at 240° C., treated with an oil and wound. A raw yarn for tire cord composed of a multifilament yarn was obtained. The yarn had a fineness (D) of 1500 denier, a number of single filaments of 750, a ratio of separated single filaments of 90% or more, a tensile strength of 17.0 g/d and an initial modulus of 380 g/d, substantially did not undergo fusion between single filaments and did not give long-period image in the small-angle X-ray scattering analysis.

COMPARATIVE EXAMPLE 1

The same procedure as the one described in Example 1 was repeated except that the ratio of the stretching with a dry heat tube was 3.9 instead of 5.1 to obtain a raw yarn for tire cord composed of a multifilament yarn. This yarn had a fineness of 2000 denier, a number of single filaments of 750, a ratio of separated single filaments of 90% or more, a tensile strength of 13.2 g/d, a modulus in tension of 274 g/d, substantially did not undergo fusion between single filaments and gave long-period image of 198 Å in the small-angle X-ray scattering analysis.

A tire cord obtained by the use of this raw yarn exhibited cord characteristics which largely varied depending upon the coefficient of twist. As will be described in Comparative Examples 3 and 7, the tire cord was satisfactory as a carcass component, but unsatisfactory as a belt component in terms of cord properties.

EXAMPLE 2

A 10% by weight solution of a completely saponified polyvinyl alcohol (degree of saponification: 99.8% or more) having a degree of polymerization of 4600 in dimethyl sulfoxide (DMSO) was spun by the same dry-jet-wet spinning process as that described in Example 1. The obtained coagulated multifilament yarn was washed in a methanol bath to remove the DMSO. Then, the yarn was stretched 4-fold in a methanol bath and dried, while separating the single filaments from each other with a turbulent flow of a gas. The resulting yarn was stretched 5.3-fold with a dry heat tube heated at 240° C., treated with an oil and wound. A raw yarn for tire cord composed of a multifilament yarn was obtained. The obtained yarn had a fineness of 1500 denier, a number of single filaments of 750, a ratio of separated single filaments of 90% or more, a tensile strength of 18.5 g/d, a modulus in tension of 410 g/d, substantially did not undergo fusion between single filaments and did not give long-period image in the small-angle X-ray scattering analysis.

COMPARATIVE EXAMPLE 2

Boric acid was added to a 17% aqueous solution of a completely saponified polyvinyl alcohol (degree of saponification; 99.5% or more) having a degree of polymerization of 1500 to obtain a solution having a pH of 6.0. This solution was jetted via a spinneret having 500 holes of a diameter of 0.08 mm into a coagulating bath composed of an alkaline saturated aqueous solution of Glauber's salt. The obtained coagulated multifilament yarn was subjected to 4-fold wet-heat stretching, neutralized and dried. The resulting yarn was stretched 3.6-fold in a hot air of 235° C., to obtain a raw yarn for tire cord composed of a multifilament yarn. The obtained yarn had a fineness of 1500 denier, a number of single filaments of 500, a ratio of separated single filaments of 90% or more, a tensile strength of 11.2 g/d, a modulus in tension of 235 g/d, substantially did not undergo fusion between single filaments and gave long-period image of 180 Å in the small-angle X-ray scattering analysis.

EXAMPLES 3 TO 5 AND COMPARATIVE EXAMPLES 3 TO 6

Seven tire cords for a belt component having coefficients of twist given in Table 1 were produced by the use of the raw yarns obtained in Examples 1 and 2 and Comparative Examples 1 and 2. The cord properties thereof were measured. The results are shown in Table 1.

TABLE 1

| | Raw yarn | Coefficient of twist | Tensile strength (g/d) | MDE (%) | ΔS (%) |
|---|---|---|---|---|---|
| Ex. 3 | yarn obtained in Ex. 1 | 1205 | 12.6 | 1.0 | 1.0 |
| Comp. Ex. 3 | yarn obtained in Comp. Ex. 1 | 1220 | 9.4 | 1.7 | 0.6 |
| Comp. Ex. 4 | yarn obtained in Comp. Ex. 2 | 1210 | 9.9 | 1.5 | 0.8 |
| Ex. 4 | yarn obtained in Ex. 1 | 1340 | 11.8 | 1.1 | 1.1 |
| Comp. Ex. 5 | yarn obtained in Ex. 1 | 1610 | 10.8 | 1.2 | 1.3 |
| Comp. Ex. 6 | yarn obtained in Ex. 1 | 1870 | 9.7 | 1.5 | 1.7 |
| Ex. 5 | yarn obtained in Ex. 2 | 1180 | 13.8 | 0.9 | 1.2 |

Each tire cord was produced as follows: Two raw yarns were intertwined with the number of lower twists per 10 cm of 22 and that of upper twists per 10 cm of 22 to obtain a green cord. An RFL adhesive was applied to the green cord by the use of a computreater of Litzler Co., Ltd. The obtained cord was dried at 150° C. for 120 sec under constant length and subjected to heat treatment under tension comprising a heat treatment zone of 200° C., 30 sec and a stretch ratio of 1.5% and a normalizing zone of 200° C., 30 sec and a relax ratio of 0.5% to obtain a tire cord.

EXAMPLES 6 TO 8 AND COMPARATIVE EXAMPLES 7 TO 11

Seven tire cords for a carcass component having coefficients of twist given in Table 2 were produced by the use of the raw yarns obtained in Examples 1 and 2 and Comparative Examples 1 and 2. The tire cords were examined for cord properties. The results are shown in Table 2.

TABLE 2

| | Raw yarn | Coefficient of twist | Tensile strength (g/d) | MDE (%) | ΔS (%) | Fatigue resistance (min) |
|---|---|---|---|---|---|---|
| Ex. 6 | yarn obtained in Ex. 1 | 1860 | 10.6 | 1.4 | 1.3 | 46 |
| Comp. Ex. 7 | yarn obtained in Comp. Ex. 2 | 1890 | 7.4 | 2.1 | 2.1 | 0 |
| Comp. Ex. 8 | yarn obtained in Comp. Ex. 1 | 1840 | 8.1 | 2.0 | 2.1 | 5 |
| Ex. 7 | yarn obtained in Ex. 1 | 2340 | 8.9 | 1.8 | 1.7 | 62 |
| Comp. Ex. 9 | yarn obtained in Ex. 1 | 2550 | 7.9 | 3.4 | 2.3 | 84 |
| Comp. Ex. 10 | yarn obtained in Ex. 1 | 2700 | 5.4 | 4.1 | 2.6 | 112 |
| Ex. 8 | yarn obtained in Ex. 2 | 1880 | 11.4 | 1.5 | 1.5 | 98 |

Each tire cord was produced as follows: Two raw yarns were intertwined with the number of lower twists per 10 cm of 34 and that of upper twists per 10 cm of 34 to obtain a green cord. An RFL adhesive was applied to the green cord by the use of a computreater of Litzler Co., Ltd. The resulting cord was dried at 150° C. for 120 sec under constant length and subjected to heat treatment under tension comprising a heat treatment zone of 200° C., 30 sec and a stretch ratio of 3.5% and a normalizing zone of 200° C., 30 sec and a relax ratio of 0.5% to obtain a tire cord.

We claim:

1. A tire cord comprising at least two multifilament yarns of a polyvinyl alcohol polymer, said multifilament yarns being twisted together to the coefficient of twist in the range of 500 to 2500, wherein each of said multifilament yarns consists of a plurality of single filaments of a polyvinyl alcohol polymer having a degree of polymerization of at least 2000, said yarn having a tensile strength of at least 15 g/d, and an initial modulus of at least 250 g/d, said yarn being further characterized by the fact that at least about 90% of the single filaments constituting the yarn can be separated from each other without being damaged;

said tire cord having a tensile strength of at least 8.5 g/d, a medium elongation in the range of 0.5 to 2.2%, and a thermal shrinkage in the range of 0.2 to 2.0%.

2. A tire cord as in claim 1, wherein the degree of polymerization of said polymer is in the range of 2,500 to 5,700, and said yarn has a tensile strength of at least 17 g/d and an initial modulus of at least 290 g/d.

3. A tire cord as in claim 2, wherein the degree of polymerization of said polymer is in the range of 3,000 to 5,000, and said yarn has a tensile strength of at least 18 g/d and an initial modulus of at least 230 g/d.

4. A tire cord as in any one of claims 1 and 2, wherein each of said single filaments has a fineness in the range of 0.5 to 5 denier.

5. A tire cord as in any one of claims 1 and 2, wherein said filament comprises a crystalline part and an amorphous part, and the difference in density between the crystalline part and the amorphous part is small, as evidenced by the lack of a long-period image observed in a small-angle X-ray scattering analysis of the yarn.

6. A tire cord as in any one of claims 1 and 2, wherein the coefficient of twist is in the range of 1,500 to 2,500, and the tire cord has a tensile strength of at least 8.5 g/d, a medium elongation in the range of 1.0 to 1.9%, and a thermal shrinkage in the range of 0.4 to 2.0%.

7. A tire cord as in any one of claims 1 and 2, wherein the coefficient of twist is in the range of 500 to 1,500, and the tire cord has a tensile strength of at least 11 g/d, a medium elongation in the range of 0.5 to 1.2%, and a thermal shrinkage in the range of 0.2 to 1.4%.

8. A pneumatic tire comprising a tire cord as in any one of claims 1 and 2.

* * * * *